United States Patent
Smith et al.

(10) Patent No.: US 10,445,079 B2
(45) Date of Patent: Oct. 15, 2019

(54) MAPPING AND FORMATTING INPUT COMMANDS TO A THIRD PARTY PROTOCOL

(71) Applicant: AMX LLC, Richardson, TX (US)

(72) Inventors: Mark Ethard Smith, Fairview, TX (US); Marjorie Lynne Smith, Fairview, TX (US)

(73) Assignee: HARMAN PROFESSIONAL, INC., Northridge, CA (US)

( * ) Notice: Subject to any disclaimer, the term of this patent is extended or adjusted under 35 U.S.C. 154(b) by 120 days.

(21) Appl. No.: 15/156,135

(22) Filed: May 16, 2016

(65) Prior Publication Data

US 2016/0259634 A1 Sep. 8, 2016

Related U.S. Application Data

(63) Continuation of application No. 14/986,317, filed on Dec. 31, 2015, now Pat. No. 9,342,286, which is a continuation of application No. 13/751,743, filed on Jan. 28, 2013, now Pat. No. 9,262,133.

(60) Provisional application No. 61/591,768, filed on Jan. 27, 2012.

(51) Int. Cl.
*G06F 8/51* (2018.01)
*G06F 8/40* (2018.01)
*G06F 16/245* (2019.01)
*G06F 16/22* (2019.01)
*G06F 9/54* (2006.01)

(52) U.S. Cl.
CPC .............. *G06F 8/51* (2013.01); *G06F 8/40* (2013.01); *G06F 9/542* (2013.01); *G06F 16/2282* (2019.01); *G06F 16/245* (2019.01)

(58) Field of Classification Search
CPC ..... G06F 8/40; G06F 8/51; G06F 8/76; G06F 8/447; G06F 8/541
USPC .......................................................... 717/137
See application file for complete search history.

(56) References Cited

U.S. PATENT DOCUMENTS

| | | | |
|---|---|---|---|
| 6,681,386 B1 * | 1/2004 | Amin ................. | G06F 8/51 717/115 |
| 6,687,762 B1 * | 2/2004 | Van Gaasbeck ....... | G06F 9/455 717/138 |
| 6,698,014 B1 * | 2/2004 | Rechter .................... | G06F 8/51 717/137 |

(Continued)

OTHER PUBLICATIONS

Babka et al., "Interpretive Language Processor Support for Os/400 CL Command," IBM TDB n8 01-91 p. 38-43, Jan. 1991, 7pg. (Year: 1991).*

(Continued)

*Primary Examiner* — Ryan D. Coyer

(57) ABSTRACT

A method and apparatus of translating and mapping received commands between operating system languages and/or protocol-based languages. One example method may provide receiving an action initiated by an external source, such as a person or automated action selection operation. The method may also include identifying the action as a predetermined command of a first computer operating language stored in a memory and mapping the predetermined command to a corresponding protocol command of a different computer operating language, and executing the corresponding protocol command after the mapping operation.

17 Claims, 8 Drawing Sheets

(56) References Cited

U.S. PATENT DOCUMENTS

| | | | | |
|---|---|---|---|---|
| 7,681,184 B1* | 3/2010 | Weedon | G06F 8/51 | 717/137 |
| 7,774,746 B2* | 8/2010 | Mansfield | G06F 17/227 | 704/2 |
| 8,051,410 B2* | 11/2011 | Marfatia | G06F 8/76 | 717/124 |
| 8,533,691 B2* | 9/2013 | Ben-Artzi | G06F 8/76 | 717/137 |
| 2006/0064599 A1* | 3/2006 | Yoshida | H04L 12/2803 | 713/182 |
| 2006/0075267 A1* | 4/2006 | Tokue | G06F 1/3203 | 713/300 |
| 2006/0101474 A1* | 5/2006 | Magown | G06F 9/5027 | 719/315 |
| 2010/0318259 A1* | 12/2010 | Chinnadurai | G06F 8/30 | 701/31.4 |
| 2011/0041141 A1* | 2/2011 | Harm | G06F 9/541 | 719/318 |
| 2011/0283130 A1* | 11/2011 | Pai | G06F 1/26 | 713/330 |
| 2013/0015721 A1* | 1/2013 | Lee | G06F 1/3231 | 307/126 |

OTHER PUBLICATIONS

Risley Jr, RF, "National Language Syntax Command Mapper," IMB TDB v36 n6A 06-93 p. 23-26, Jun. 1993, 5pg. (Year: 1993).*

Tirmizi et al., "Mapping between the OBO and OWL ontology languages," Journal of Biomedical Semantics, 2011, 16pg. (Year: 2011).*

* cited by examiner

| Character Class | Equivalent Expression | Description |
|---|---|---|
| \a | [A-Za-z] | Match any letter |
| \A | [^A-Za-z] | Match any non-letter |
| \w | [A-Za-z0-9_] | Match any "word" character (alphanumeric + "_") |
| \W | [^A-Za-z0-9_] | Match any non-word character |
| \s | [\t\n\r\x0B\x0C ] | Match any whitespace character |
| \S | [^\t\n\r\x0B\x0C ] | Match any non-whitespace character |
| \d | [0-9] | Match any digit |
| \D | [^0-9] | Match any non-digit |
| \x | [0-9a-fA-F] | Match any hex digit |
| \X | [^0-9a-fA-F] | Match any non hex digit |
| \c | [\x0-\x1F\x7F] | Match any control character |
| \C | [^\x0-\x1F\x7F] | Match any non-control character |
| \p | [^A-Za-z0-9 ] | Match any punctuation |
| \P | [A-Za-z0-9_] | Match any non-punctuation |
| \l | [a-z] | Match any lower case letter |
| \u | [A-Z] | Match any upper case letter |

| Macro | Equivalent Expression | Description |
|---|---|---|
| %d | (\d+) | A variable length ASCII decimal value |
| %nd | (\d{n}) | A fixed length ASCII decimal value |
| %x | (\x+) | A variable length ASCII hexadecimal value |
| %nx | (\x{n}) | A fixed length ASCII hexadecimal value |
| %b | (.) | A 1-byte little-endian binary value |
| %nb | (.{n}) | An n-byte little-endian binary value |
| %B | (.) | A 1-byte big-endian binary value |
| %nB | (.{n}) | An n-byte big-endian binary value |
| %D | ([\x00-\x09]+) | A variable length big-endian BCD value |
| %nD | ([\x00-\x09]{n}) | A fixed length big-endian BCD value |

MAPPING AND FORMATTING INPUT COMMANDS TO A THIRD PARTY PROTOCOL

CROSS-REFERENCE TO RELATED APPLICATIONS

This application is a continuation of application Ser. No. 14/986,317, entitled "MAPPING AND FORMATTING INPUT COMMANDS TO A THIRD PARTY PROTOCOL", which was filed on Dec. 31, 2015, now issued U.S. Pat. No. 9,342,286, issued on May 17, 2016, which is a continuation of application Ser. No. 13/751,743, entitled "MAPPING AND FORMATTING INPUT COMMANDS TO A THIRD PARTY PROTOCOL", which was filed on Jan. 28, 2013, now issued U.S. Pat. No. 9,262,133, issued on Feb. 16, 2016, which claims priority to an earlier filed U.S. Provisional Application Ser. No. 61/591,768, entitled "Mapping and Formatting Input Commands to a Third Party Protocol", which was filed on Jan. 27, 2012, the entire contents of which are hereby incorporated by reference.

TECHNICAL FIELD OF THE INVENTION

This invention relates to a method and apparatus of receiving and mapping input commands of a first computer program type to a different computer programming language and/or communication protocol.

BACKGROUND OF THE INVENTION

Conventionally, attempts to communicate or provide compatible commands to a protocol or computer-based language may include the parsing of incoming messages and the building of outgoing messages. Java® (hereafter 'Java') and controllers or control systems lack built-in functions to perform such parsing and building functions as part of the actual computer language itself. Instead, complex routines must be written to decipher an incoming message and/or to build outgoing messages.

In computer science terms Java is a $3^{rd}$ generation language or a general purpose high-level language. Controllers can be categorized as a mixture of $3^{rd}$ generation and $4^{th}$ generation languages. A $4^{th}$ generation language is one that is designed specifically to solve a particular problem. In the case of a controller, its purpose was to communicate with an Internet control system protocol (ICSP)/AxLink type of device. Conventional programming languages and corresponding interpretation engines have yet to combine high-level language interpretation with protocol translation.

SUMMARY OF THE INVENTION

One embodiment of the present invention may include a method of performing a computer language conversion. The method may include receiving at least one action initiated by an external source. The method may also include identifying via a processor the at least one action as a predetermined command of a first computer operating language stored in a memory. The method may further include mapping the predetermined command of the first computer operating language to a corresponding protocol command of a different computer operating language, and executing the corresponding protocol command.

Another example embodiment of the present invention may include an apparatus configured to perform a computer language conversion. The apparatus may include a memory and a receiver configured to receive at least one action initiated by an external source. The apparatus may also include a processor configured to identify the at least one action as a predetermined command of a first computer operating language stored in the memory, map the predetermined command of the first computer operating language to a corresponding protocol command of a different computer operating language, and execute the corresponding protocol command.

BRIEF DESCRIPTION OF THE DRAWINGS

FIG. 4 illustrates an example table of the associations among a character set and the next generation language according to example embodiments.

FIG. 5 illustrates an example table of the associations among the regular expression macros and the next generation language according to example embodiments.

DETAILED DESCRIPTION OF THE INVENTION

Figures 1A, 1B:
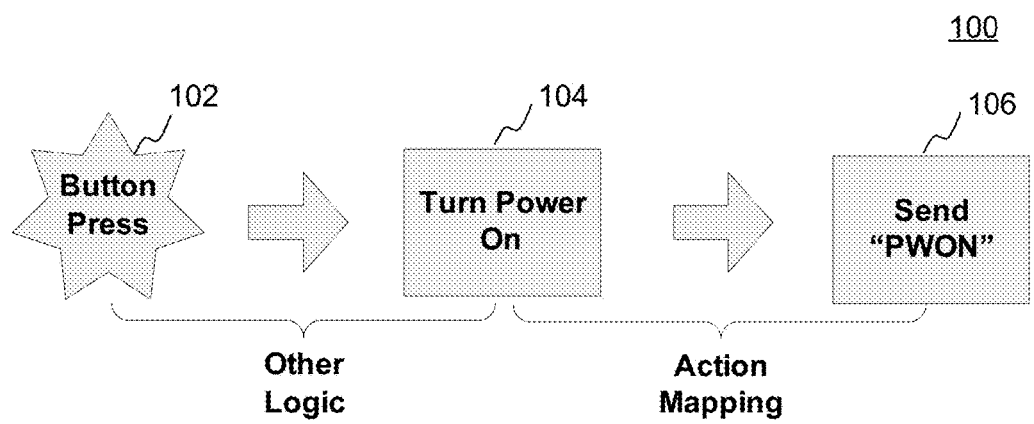
FIG. 1A illustrates an action and command interpretation sequence according to example embodiments.
FIG. 1B illustrates an example command interpretation table according to example embodiments.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention provide a next generation language that is simple to learn for trivial protocols, may operate with complex protocols, supports a common language for one-way and two-way engines, supports both binary and ASCII protocols, and which supports 75% of known protocols. The example next generation language may provide syntax that allows the programmer to describe messages as patterns for automatic recognition and creation. The next generation language according to example embodiments is a $4^{th}$ generation language configured to communicate with serial and Internet protocols and to translate those communications to/from a set of commands and/or events. This next generation language may be optimized for a variety of unique situations.

To understand how the next generation language operates, it is important to understand the high-level problem(s) that are trying to be solved. One assumption is that some sort of intelligent decision has been made to perform a corresponding action. This decision may have been made by a human pressing a button or a time-of-day timer schedule beginning by an automated switch. The next generation language provides a mechanism to take the action request and map it onto a unique third-party protocol or other operating system language.

Initially, a set of well-known actions needs to be defined. This set of actions may include a channel level command and a Java application programming interface (API), which defines a similar set of actions in Java API method calls. For the next generation language of the present invention, these actions are described by well known text names with optional arguments. Commands may be defined as the outcome of an action taken, such as a user presses a button, and as a result a power on command is transferred to a command receiving engine as described in further detail below with reference to FIGS. 1A and 1B.

FIG. 1A illustrates an action and command interpretation sequence 100 according to example embodiments. Referring to FIG. 1A, an action taken by a user or other action source (e.g., automated timer, external device, external program source) may be received as an example button 102 being pressed. In response, predefined logic may be used to resolve the button being pressed as a command such as power being turned on 104. An action mapping procedure may be used to map the received command to a third-party protocol (PWON) 106.

FIG. 1B illustrates one example command set interpretation table 150 according to example embodiments. The input command may begin as either of two actions: "power on" and "power off", which are in turn defined to be well known commands 152, such as "Power.SetPowerOn" and "Power.SetPowerOff." For this example, the next generation language may map these well known commands to third-party commands 154 associated with third-party protocol "PWON" and/or "PWOFF." Messages transmitted and received may operate in a similar way. The next generation language may perform a mapping operation to map incoming strings to well known events and optional argument(s).

The next generation language is configured as having layers of features (e.g., 3 or more features). A simple user action might only invoke the bottom layer of features. This user action may not require the more complicated features. For example, based on the example provided above in FIGS. 1A and 1B, a string map may be utilized by a digital server to receive the action, interpret the action as a first language command and interpret the first language command as a different language command of a third-party language and/or protocol. Such a set of command handling procedures may be used to control the power on an attached monitor.

Protocols and corresponding use cases tend to become increasingly more complicated than the simple power control command example described above. To operate with more complicated commands and responses, the strings used to represent the third party strings are format descriptions (for commands) and regular expressions (for responses). In the example above, the string "PWON" is a simple command format or a simple regular expression. According to another example, if the volume was desired to be set to level '59', then a corresponding command might be "VOL=% d" which would be automatically converted to "VOL=59" if the command had 59 as its optional argument. Likewise an event of "VOL=(\d+)" would automatically parse the string "VOL=59" and extract the value "59" as an argument of the event.

The basic structure of the next generation language may include XML-based syntax and compatible commands. This structure may permit execution engines to easily skip-over and ignore certain features of the language that the engine does not understand. For example, some parts of the language will describe how to send commands to a device while others will describe how to interpret responses from the device. Using XML as the high-level syntax allows processing engines, which do not understand feedback, to skip over the response parsing code and only consume the command generation portion of the script.

All of the examples discussed this far are ASCII (i.e. text) based examples. The next generation language will operate with ASCII or binary. To insert non-ASCII numbers into a format or regular expression the number(s) can be extracted with a simple extraction command "\x" to create non-ASCII strings. For example, "\x01\x02\x03" would represent three binary bytes of 1, 2 and 3. The next generation language may utilize a short hand for binary messages. Any description that starts with '#' is assumed to be in binary short-hand so the previous description could be written as "#01 02 03".

The next generation language also include a simple scripting language to augment its command generators and feedback parsers. A typical example would include defining volume to be in a range of 0-255, with a particular device utilizing a range of 0-100. In this case, the volume argument should be scaled appropriately before it is applied to the command format. The next generation language may be deployed as a single script on multiple platforms.

According to one example, a program module(s) may be configured to read a next generation language description file and execute it inside the a computer language architecture. This type of configuration may provide a quick turn module for simple devices, source code that could be distributed and edited by support and dealers, and a method for dealers to write operational modules. A program module design provides for a generic module that can be for any device type (VCR, DVD, TV, etc.). When that architecture is in place, a single next generation language module can be written to run any next generation language script as a program embedded in a computer. This super module could be shipped as part of a master run-time so the product dealer would only install the script and not the module. One program module may be written to run TV scripts, another module may run HVAC scripts, etc.

According to example embodiments, a next generation language data file may be implemented as an XML, file containing a protocol description. The top level XML, tag would be <protocol> and would have three major sections including configuration, transport and state(s). Three other 'action' tags will also exist and can be used inside of the transport and state sections. Those actions tags may include command, event and timer. The overall structure of the file may look similar to the example provided below:

```
<protocol>
    <properties>
        ...
    </properties>
    <transport>
        ...
    </transport>
    <state id="default">
        ...
    </state>
    <state id="other">
        ...
    </state>
</protocol>.
```

Figure 2:
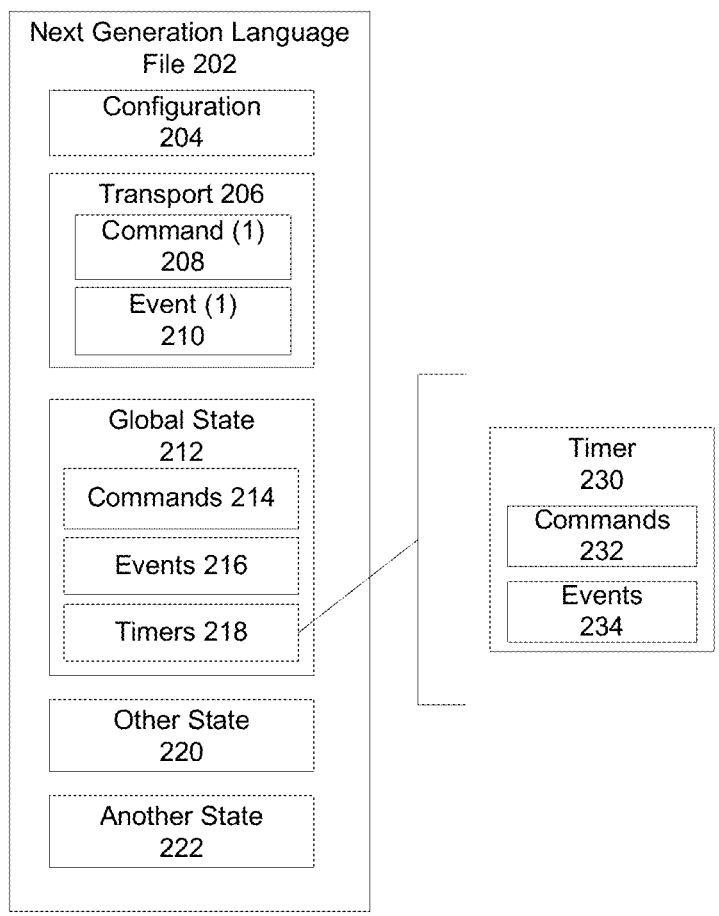
FIG. 2 illustrates an example next generation language file according to example embodiments.

FIG. 2 illustrates an example next generation language file according to example embodiments. Referring to FIG. 2, a next generation language file 202 may include a configuration section 204 which includes configuration information used to perform information mapping between command information and protocols. The transport section 206 may include at least one command section 208 and one event section 210 based on the event and command data that is received and interpreted by a corresponding next generation language engine. This information may be received and used to perform the information mapping. The example file may also include a global state portion 212 which includes commands 214, events 216 and timers 218 used to dictate the present state based on any received commands, events and timers that are set to change the present operating conditions. Additional portions of the next generation language file may include additional states 220 and 222 based on the commands received. An external timer source 230 may modify a current state or invoke a new state via a corresponding timing command 232 or timing state 234.

Figure 3A:
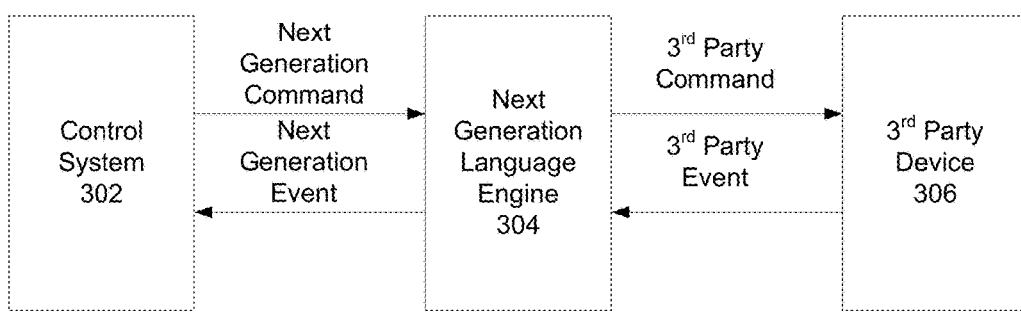
FIG. 3A illustrates a message content and message flow example corresponding to a next generation language parsing engine according to example embodiments.

FIG. 3A illustrates a message flow 300 corresponding to a next generation language engine according to example embodiments. Referring to FIG. 3A, a control system 302 represents a data processing engine configured to transmit and receive messaging commands. The control system 302 may receive and transmit commands to a next generation language engine 304 which is also configured to receive commands from the control system 302, for example, a master controller, and convert the command to a $3^{rd}$ party equivalent command. The converted commands may be forwarded to a third party processing engine or device 306. Also, incoming traffic from the third party device 306 may be scanned for patterns to detect incoming messages and those messages are translated into standard, well-known events that can be understood by the control system 302. These well-known messages are then sent back to the control system 302.

As illustrated in FIG. 3A, the $3^{rd}$ party commands and events are assumed to be 8-bit binary data buffers. These commands or events could be carried along via transmission control protocol (TCP), serial protocols or some other media format. The next generation language engine 304 may produce and consume raw buffers and assume that a particular implementation of the engine understands how to read and write them onto a communication medium.

The "well known" commands and events are a set of strings. Each command and/or event has an identifier (ID) which is a string consisting of ASCII characters. Along with the ID, each command or event can have up to 10 arguments. One of the arguments is reserved, leaving 9 for system use. These arguments are also ASCII strings. If an argument is numeric, then it should be encoded as an ASCII decimal number. For example, the number '0x1C' should be encoded as '2' and '8'.

Figure 3B:
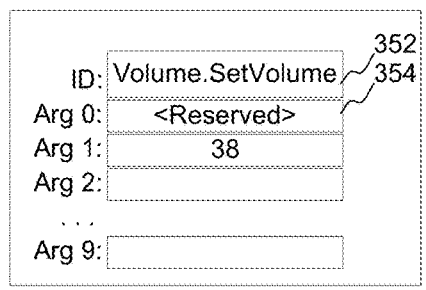
FIG. 3B illustrates a message content example corresponding to a next generation language according to example embodiments.

An example of the structure of a command used to set a volume control is illustrated in FIG. 3B. Referring to FIG. 3B, the volume example 350 includes various parameters used to control a volume level to 38. Referring to the example 350, the command and event ID's are represented in the ID field of command as a known command variable structure 'Volume.SetVolume' 352 followed by one or more arguments 354. In this example, a first argument 'Arg 0' represents a<Reserved> argument and the second argument 'Arg 1' represents the volume level desired (38). The arguments are stored in a set of special variables. In the scripting language these variables are represented by the syntax of $0, and $1 through $9. $0 is used for several specific purposes and is generally reserved as illustrated in FIG. 3B. Commands, events and scripts can all use and modify these variables. The details of how they are used will be described in the sections below.

The configuration section 204 of the next generation language interpretation engine/file allows the definition of name/value pairs to configure the engine. Baud rate is one example of a configuration property. The configuration items may also be tied into a property mechanism of a corresponding operation engine to allow run-time modifications. One example format may provide:

```
<properties>
    <property name="name" value="value"/>
</properties>.
```

Example properties may include: PHY_LAYER, BAUDRATE, Has-Lamp, duet. components, etc.

The transport section 206 defines a pattern to describe the scope of an individual message. This configuration provides the system with a convenient way to perform error recovery when a byte is lost and also reduces the verbosity of the individual commands and events. The transport section contains exactly one command and one event. Such a command/event provides the system with what a typical command and event. For example, if every command ends with a newline character or a 32 bit CRC, this pattern can be programmed into the transport section 206 so the individual commands and events do not contain redundant data. This also provides hints to the engine to recover from bad messages.

According to one example, for a typical Telnet protocol, the English description of a transport would include any number of ASCII characters, followed by a newline. In this example, the transport algorithm would search for a newline, remove the newline, and pass the "any number of ASCII characters" that preceded the newline to the event engine. For example, a transport layer might receive "hello\n" and forward "hello" to the event processor. Likewise, when generating commands to send to the device, the transport layer 206 may add any additional fields that are common to the protocol. Again, using the Telnet protocol as an example, the transport layer 206 would automatically add a new line to any message sent by the command engine. For example: a transport layer 206 might be told to send "goodbye", but would actually send "goodbye\n". The transport clause may contain a single command and a single event. The command is assumed to pull from the $0 variable and the event is assumed to fill the $0 variable.

Modifiers to the transport section 206 may include max (optional) to represent the maximum message size. This max parameter may provide a hint to the transport algorithm that an error has occurred and informs the transport what maximum buffer size is required. Another parameter is style (optional), which provides a style for the transport algorithm. It is assumed that several 'styles' of transport may be eventually developed. Each style can be thought of as a separate algorithm or library in the engine. Other parameters include RegEx transport (currently the only one), RegEx with Ack/Nak flow control, RegEx with timed flow control, and advanced transports such as, SOAP, BACnet, etc.

The state represents a list of commands, events and timers that can be enabled and disabled as a group. Several states can be defined. One state is named the "default" state and is active at all times. Of the remaining states, only one (or zero) may be active at any given time. Most commands and events will go into the default state. In fact, simple one-way devices may not use any other state.

On startup, the default state may be immediately made active, which provides no present secondary state. To create a secondary state, either a command or an event must be triggered with a 'goto' attribute set. The system may change to the new state after the command or event has completed. If there is no secondary state, one will be created. If a secondary state already exists, it will be stopped before the new one is started. To destroy the secondary state, a 'goto' attribute may be implemented with an undefined state. The empty quotes (" ") may be used as a convention for the name of an undefined state. The "default" state will always remain active regardless of starting and stopping of secondary states.

When a state is initialized, its commands and events are added to the command and event lists accordingly which are being monitored by the next generation language system. When a state stops by jumping to a different state or the undefined state its commands and events are removed from the monitored list. Likewise, any timers in the state may be started when the state is initialized and stopped when the state is stopped.

For the more complicated protocols, states allow additional control over the environment. For example, if an action was presented to query an electronic network compatible thermostat for the temperature and it only returned a number then a corresponding event may appear as: <event id="HVAC.UpdateTemperature", format="% d"/>. However, if a query was sent for the set point and it also just returned a number, then that would mistakenly generate a temperature event because it was defined that any message containing just a number is the temperature. Below is an example bit of code to illustrate the issue:

```
<state id="default">
    <command id="Get Temperature" format="?TEMP"/>
```

```
    <command id="GetSetpoint" format="?SETP"/>
    <event id="Is this a temperature or setpoint" format="%d"/>
</state>
```

The states allow the operator to recall what they are doing. With states, you can define two events that accept a simple number, and which state is active will determine which event will trigger. Another example with the temperature and set point being modified together provides:

```
<state id="default">
    <command id="GetTemperature" format="?TEMP" goto="waitingForTemp"/>
    <command id="GetSetpoint" format="?SETP"/ goto="waitingForSetpoint">
</state>
<state id="waitingForTemp">
    <event id=" HVAC.UpdateTemperature" format="%d" goto=""/>
</state>
<state id="waitingForSetpoint">
    <event id=" HVAC.UpdateSetpoint" format="%d" goto=""/>
</state>
```

Commands 214 are executed when a command(s) is received from the control system. When a command is received, the next generation language system will search for a command tag with an ID attribute that matches the received command. When a command match is found, the following actions will be taken and may be taken in order. First, the arguments of the command are placed in the system variables ($0-$9). Next, any script associated with the command is executed and then the outgoing message is created using the format description and provided to the transport layer. Then, the state change associated with the command (if any) will be executed.

The format attribute of a command contains a format template to generate or map to the corresponding $3^{rd}$ party command. The template is similar, but not the same as the format in a 'C' language 'printf' statement. The template may include a series of ASCII characters (which are taken literally) with escape sequences and field descriptors. An escape sequence is a character that cannot be represented by normal ASCII text. A tab character would be a good example of such an escape sequence. Escape sequences begin with a backward slash ('\') followed by a character(s) that determines the true byte value. Below are examples illustrating the escape sequences supported by the next generation language engine. The escape sequence \\ represents the '†' character and the \xNN sequence produces the binary value represented by the two hex digits NN.

A field descriptor inserts a system variable ($1-$9) into the string. The descriptor starts with the '%' character, followed by optional argument(s) and ending with a character determining any conversion that should be performed prior to inserting into the string. Below is an example of the field descriptors supported by the next generation language. Field descriptor '%%' represent the '%' character. Descriptor '% s' inserts the system variable without any modification.

Events attempt to match their format attribute to incoming messages received from the transport layer. If a match is found, the next generation language event ID (which is stored in the ID field of the event) is sent to the next generation language automation system. The objective is to parse a $3^{rd}$ party event string (either ASCII or binary) and extract any relevant information in a single line of code.

When an event is matched the following actions will be taken, perhaps in the following order. First, the information extracted will be placed into system variables. Second, the script associated with the event (if any) will be executed. Next, the next generation event will be sent to the automation system. Then, the state change associated with the event (if any) will be executed.

The ASCII version of the regular expression language follows the common syntax for Perl and POSIX regular expressions. Following normal regex conventions, when a match is found, the matching string is placed into a variable numbered zero. Sub-expressions are marked the within expression using parenthesis. Up to nine sub-expressions are allowed and are placed into variables numbered one through nine. In the next generation language, these ten variables are, of course, the system variables $0 through $9. Since the match on the entire message is usually not of interest, $0 is rarely used, but is implemented to be consistent with other regular expression parsers. For example, assume the following string is received: "TEMP=93". A possible regular expression to parse this would be "TEMP=(\d+)". This expression points to the string "TEMP=" followed by 1 or more digits. The \d is shorthand for digit, the +represents 'one or more'. The parenthesis indicate that the string of digits is a sub-expression and that they should be saved into a variable. In this case, the system variable $0 would contain "TEMP=93" and $1 would contain "93". If a second set of parenthesis were in the expression it would have been stored in $2.

The examples below detail the supported regular expression features beginning with a meta-character and following with a corresponding description. Meta-character "." matches any single character. Within bracket expressions, the dot character matches a literal dot. For example, "a.c" matches "abc", etc., but "[a.c]" matches only "a", ".", or "c". Meta-charcacter '?' matches the preceding element zero or one time. For example, "ba?" matches "b" or "ba". Meta-charcacter "+" matches the preceding element one or more times. For example, "ba+" matches "ba", "baa", "baaa", and so on. Meta-charcacter "*" matches the preceding element zero or more times. For example, "ba*" matches "b", "ba", "baa", "baaa", and so on. Meta-charcacter "^" matches the starting position within the string. Meta-charcacter "$" matches the ending position of the string. Meta-charcacter "[ ]" matches a single character that is contained within the brackets. For example, "[abc]" matches "a", "b", or "c". "[a-z]" specifies a range which matches any lowercase letter from "a" to "z". These forms can be mixed: "[abcx-z]" matches "a", "b", "c", "x", "y", or "z", as does "[a-cx-z]". The '-' character is treated as a literal character if it is the last or the first character within the brackets, or if it is escaped with a backslash: "[abc-]", "[-abc]", or "[a\-bc]".

The "[^ ]" character matches a single character that is not contained within the brackets. For example, "[^abc]" matches any character other than "a", "b" or "c", and [^a-z] matches any single character that is not a lowercase letter from "a" to "z". As indicated above, literal characters and ranges can be mixed together. The "( )" character defines a marked sub-expression. The string matched within the parentheses can be recalled later. A marked sub-expression is also called a block or capturing group. The character "{m,n}" matches the preceding element at least "m" and not more than "n" times. For example, "a{3,5}" matches only "aaa", "aaaa", and "aaaaa." If "n" is not present, then it matches the preceding element exactly "m" times. For example "a{4}" matches only "aaaa." Character classes are short hand methods of expressing a common pattern. For example, '\d' is short hand for [0123456789]. The next generation language supports several of the Perl® character classes illustrated in table 400 of FIG. 4. Referring to FIG. 4, the "character class", the "equivalent expression" and the corresponding "description" are each provided as various examples of the corresponding associations among the Perl character set and the next generation language according to example embodiments.

An extension to the standard regular expression syntax includes the allowance of a system variable ($1-$9) where a constant integer would normally be allowed. A binary regular expression can be performed using the ASCII rules with the following additions to the engine, $ matches the end of buffer and/or string, 0 (zero) is a valid character (not a string terminator), the escape sequence \x?? is used to generate bytes that can not be represented with ASCII. These additions have been added and do not conflict with the ASCII definition of the language.

To alleviate the burden of expressing binary strings using escape sequences, a shorthand procedure may also be added to make binary protocols more legible. This shorthand is denoted by the '#' character being the first character in a sequence (if '#' is a literal first character in a pattern, it should be preceded by the '\' escape character). After the '#' character, all remaining characters are treated as 1-byte HEX strings ignoring white space(s). Special characters may be able to maintain the same meanings. The following examples are similar to the ASCII examples except that the examples are provided in the binary shorthand.

Examples of the meta-characters and their corresponding description are provided. Meta-character "." matches any single character. Within bracket expressions, the dot character matches a literal dot. For example, '#61.63' matches "abc", etc., but '#[61 2E 63]' matches only "a", ".", or "c". Meta-charcacter "?" matches the preceding element zero or one time. For example, "#62 61?" matches "b" or "ba". Meta-charcacter "+" matches the preceding element one or more times. For example, "#62 61+" matches "ba", "baa", "baaa", and so on. Meta-charcacter "*" matches the preceding element zero or more times. For example, "#62 61*" matches "b", "ba", "ba", "baaa", etc. Meta-charcacter "^" matches the starting position within the string. Meta-charcacter "$" matches the ending position of the buffer. Meta-charcacter "[ ]" is a bracket expression which matches a single character that is contained within the brackets. For example, "#[61 62 63]" matches "a", "b", or "c". The example "#[61-7A]" specifies a range which matches any lowercase letter from "a" to "z". These forms can be mixed, for example, "#[61 62 63 78-7A]" matches "a", "b", "c", "x", "y", or "z", as does "#[61-63 78-7A]". The "-" character is treated as a literal character if it's the last or the first character within the brackets, or has escaped with a backslash "#[61 62 63 -]", "#[- 61 62 63]", or "#[61 \-62 63]". Meta-charcacter "[^ ]" matches a single character that is not contained within the brackets. For example, "#[^61 62 63]" matches any character other than "a", "b", or "c". The character "#[^61-7A]" matches any single character that is not a lowercase letter from "a" to "z". As above, literal characters and ranges can be mixed. Meta-character "( )" defines a marked sub-expression. The string matched within the parentheses can be recalled later. A marked sub-expression is also called a block or capturing group. Meta-character "{m,n}" matches the preceding element at least "m" and not more than "n" times. For example, "#61{3,5}" matches only "aaa", "aaaa", and "aaaaa" If "n" is not present, then it matches the preceding element exactly "m" times. For example "#61{4}" matches only "aaaa".

According to another example, a list of equivalent expressions shown in ASCII, binary, and binary shorthand are provided to demonstrate the associations between ASCII, binary, binary shorthand and the matches. For example, ASCII "a" binary "\x61", binary shorthand "#61" matches "a", and "ab", "binary \x61\x62" and binary shorthand "#61 62" match "ab". Also, ASCII "ab*", binary "\x61\x62*" and binary shorthand "#61 62" match "a, ab, abb, abbb, . . . ."

Regular expression macros are a customized extension to a normal regular expression. These regular expression macros act like an extension to the character classes mentioned above with the exception that they not only match a sub-expression, but also manipulate its content. For example, if a device sends a message that contains a hexadecimal number such as 'VOL=FF' where we know the argument is going to be a 2-digit hexadecimal number then it could be parsed with the normal regular expression 'VOL=(\x{2})' or 'VOL=(\x\x)' or even 'VOL=(\x+)' if we don't worry about matching the exact number of digits. Each of these expressions may place the value of 'FF' into $1. As mentioned earlier, the next generation language will assume that all system variables that contain numbers are formatted in ASCII decimal so the characters 'FF' will be interpreted as zero since that's not a decimal number.

Regular expression macros not only shorten the syntax but also convert the data based on the data type of the macro. All macros begin with "%" instead of "\" which makes them reminiscent of the formatting syntax of commands. So using a macro we could write 'VOL=% x' or 'VOL=%2x'. These would translate into 'VOL=(\x+)' and 'VOL=(\x{2})' automatically which have a lack of parenthesis and a greedy operator (+). It will also convert the 'FF' to '255' before placing it into the system variable.

The list of supported regular expression macros is illustrated in the table 500 of FIG. 5. Referring to FIG. 5, the "macro", the "equivalent expression" and the corresponding "description" are each provided as various examples of the corresponding associations among the list of supported regular expression macros and the next generation language according to example embodiments. Examples of such associations may include ASCII decimal data, where no conversion is actually preformed, ASCII hexadecimal data, binary data—both big-endian and little-endian, and binary BCD data. An additional element is the timer. Timers allow the user to easily schedule commands or events to begin. Timers are automatically started when its corresponding container state is made active and automatically stopped when its state is inactive. Timers in the global state are started on startup and never stopped.

Figure 6:
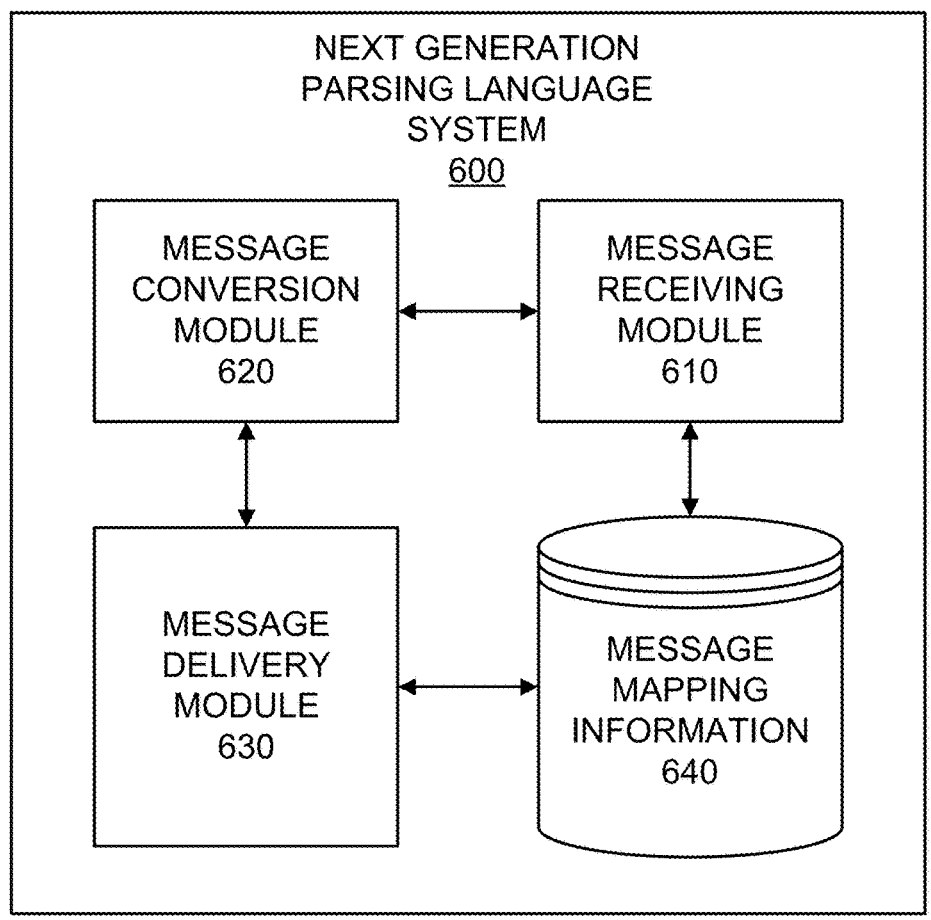
FIG. 6 illustrates an example system configuration of a next generation parsing engine system according to example embodiments.

FIG. 6 illustrates an example next generation language (NGL) parsing engine system according to example embodiments. The (NGL) system 600 may include a message receiving module 610 configured to receive actions and other data messages from an external and/or remote source. The message conversion module 620 may parse, map and perform related operations necessary to interpret the received message and format the message for delivery to a third party operating system language and/or communication protocol. The message mapping information 640 may provide data tables and other resources necessary to identify the types of actions/commands received, and the corresponding parameters necessary to provide the appropriate mapping information to perform mapping operations and parsing operations. Lastly, the message delivery module 630 may deliver the converted/mapped command structure to the third party device.

One example of the system operation may perform a computer language conversion procedure. The procedure may include receiving at least one action initiated by an external source at the message receiving module 610. The message receiving module 610 and the message conversion module 620 may perform identifying via a processor the action as a predetermined command of a first computer operating language stored in memory of the message mapping information database 640. The message conversion module 620 may also perform mapping the predetermined command of the first computer operating language to a corresponding protocol command of a different computer operating language and executing the corresponding protocol command. The message delivery module 630 may be responsible for transmitting the converted command to a remote device operating a third party communication protocol (i.e., the different computer operating language).

According to another example operation of the system 600, the action provided by the external source may be a power-on input action and/or a power-off input action performed on a device corresponding to the external source. Also, the mapping of the predetermined command of the first computer operating language to a corresponding protocol command of a different computer operating language may also include retrieving a translation table from the database 640 and matching the action to the predetermined command stored in the translation table via the message conversion module 620, which also performs parsing a character string from the action, and extracting a numeric value of the character string based on the parsing operation. The parsing the character string may include parsing the numeric value and identifying the numeric value as an argument used to execute the corresponding protocol command. In another example, the argument may include a volume level and/or a temperature level. The message delivery module may perform creating a data file including the state that identifies the predetermined command and at an event corresponding to the action, and store the parsed information in the data file prior to delivering the data file to the remote source.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of FIGS. 1-3.

Figure 7:
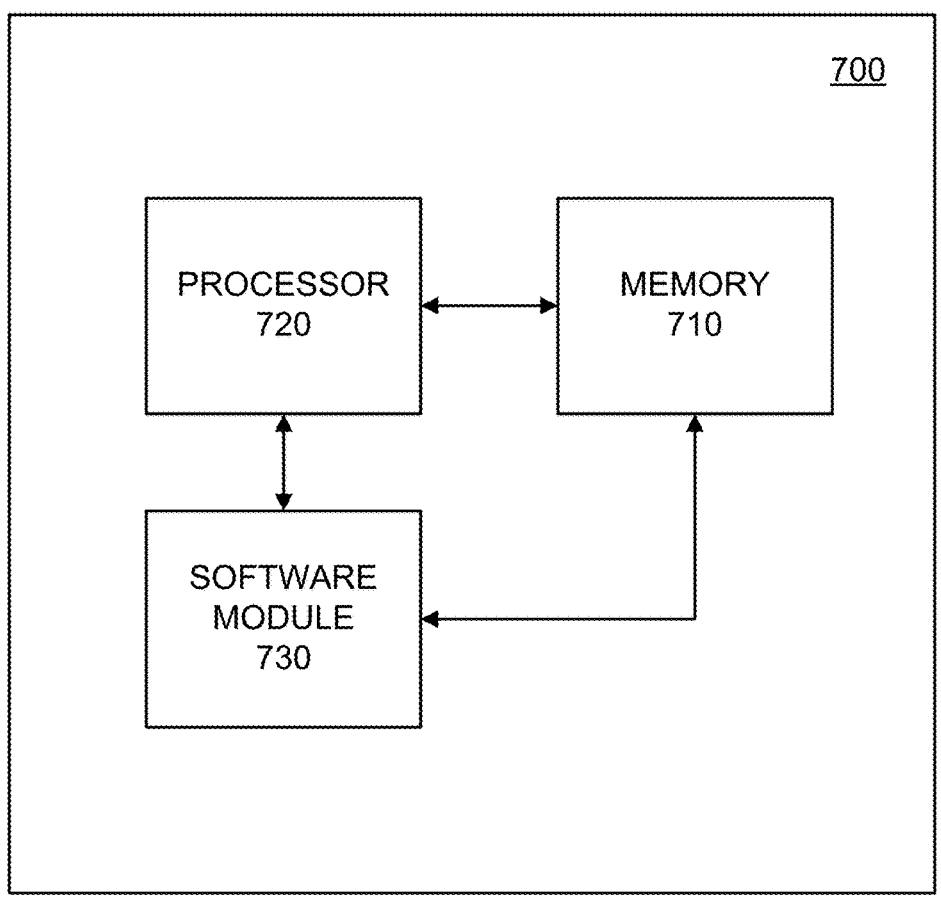
FIG. 7 illustrates a network entity that may include memory, software code and other computer processing hardware used to perform various operations according to example embodiments.

As illustrated in FIG. 7, a memory 710 and a processor 720 may be discrete components of the network entity 700 that are used to execute an application or set of operations.

The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Figure 8:
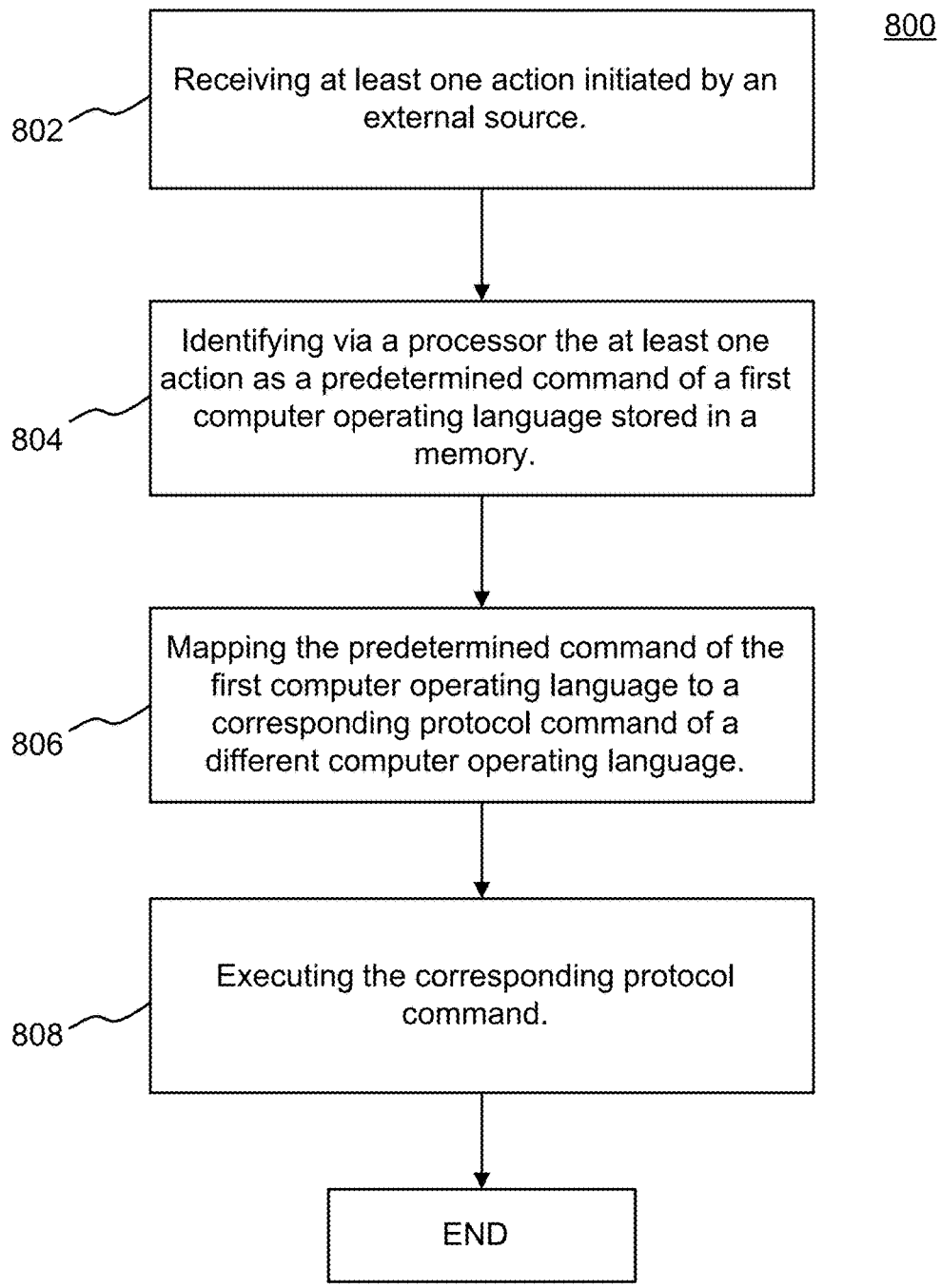
FIG. 8 illustrates an example flow diagram of an method of operation according to example embodiments.

One example method of operation is illustrated in the flow diagram of FIG. 8. Referring to FIG. 8, the flow diagram 800 illustrates an example method of performing a computer language conversion. The method may include receiving at least one action initiated by an external source 802. The external source may be a person pressing a button, an automatic timer that matured into an action, etc. The method may also include identifying via a processor the at least one action as a predetermined command of a first computer operating language stored in a memory 804. The method may further include mapping the predetermined command of the first computer operating language to a corresponding protocol command of a different computer operating language 806. The first language may be a programming language, such as Java and the second language may be a protocol language, such as IP. The method may also include executing the corresponding protocol command 808.

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the system illustrated in FIG. 6 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   receiving, via a processor, a predetermined command having a format of a first conventional computer programming language, the predetermined command being generated in response to an action performed with respect to a computing device;
   translating, via the processor, the predetermined command in the format of the first conventional computer programming language into a corresponding protocol command having a format of a second conventional computer programming language, wherein the translating comprises identifying an identifier and an argument value from a string that represents the predetermined command, mapping the identifier to an identifier of the corresponding protocol command, and converting the argument value into a system variable of the corresponding protocol command; and
   executing, via the processor, a second conventional programming language application with the translated protocol command as an input to generate a processing result based on the action performed with respect to the computing device.

2. The method of claim 1, wherein the action is provided by an external source and is at least one of a power-on input action and a power-off input action performed on a device corresponding to the external source.

3. The method of claim 1, wherein the translating comprises:
   retrieving a translation table from a database;
   matching the action to the predetermined command stored in the translation table; and
   extracting a numeric value from a character string of the predetermined command.

4. The method of claim 3, wherein the method further comprises parsing the character string and identifying the numeric value as an argument used to execute the corresponding protocol command.

5. The method of claim 4, wherein the argument comprises at least one of a volume level and a temperature level.

6. The method of claim 1, wherein the method further comprises storing a mapping of the translation in an extensible markup language (XML) file.

7. An apparatus, comprising:
   a processor configured to:
   receive a predetermined command having a format of a first conventional computer programming language stored, the predetermined command being generated in response to an action performed with respect to a computing device;
   translate the predetermined command in the format of the first conventional computer programming language into a corresponding protocol command having a format of a second conventional computer programming language, wherein the processor identifies an identifier and an argument value from a string that represents the predetermined command, maps the identifier to an identifier of the corresponding protocol command, and converts the argument value into a system variable of the corresponding protocol command; and
   execute a second conventional programming language application with the translated protocol command as an input to generate a processing result based on the action performed with respect to the computing device.

8. The apparatus of claim 7, wherein the action is provided by an external source and is at least one of a power-on input action and a power-off input action performed on a device corresponding to the external source.

9. The apparatus of claim 7, wherein the processor is configured to:
   retrieve a translation table from a database;
   match the action to the predetermined command stored in the translation table; and
   extract a numeric value from a character string of the predetermined command.

10. The apparatus of claim 9, wherein the processor is further configured to parse the character string and identify the numeric value as an argument used to execute the corresponding protocol command.

11. The apparatus of claim 10, wherein the argument comprises at least one of a volume level and a temperature level.

12. The apparatus of claim 7, wherein the processor is further configured to store a mapping of the translation in an extensible markup language (XML) file.

13. A non-transitory computer readable storage medium configured to store instructions that when executed causes a processor to perform:
   identifying a predetermined command having a format of a first conventional computer programming language, the predetermined command being generated in response to an action performed with respect to a computing device;
   translating the predetermined command in the format of the first conventional computer programming language into a corresponding protocol command having a format of a second conventional computer programming language, wherein the translating comprises identifying an identifier and an argument value from a string that represents the predetermined command, mapping the identifier to an identifier of the corresponding protocol command, and converting the argument value into a system variable of the corresponding protocol command; and
   executing a second conventional programming language application with the translated protocol command as an input to generate a processing result based on the action performed with respect to the computing device.

14. The non-transitory computer readable storage medium of claim 13, wherein the action is provided by an external source and is at least one of a power-on input action and a power-off input action performed on a device corresponding to the external source.

15. The non-transitory computer readable storage medium of claim 13, wherein the translating comprises:
   retrieving a translation table from a database;
   matching the action to the predetermined command stored in the translation table; and
   extracting a numeric value from a character string of the predetermined command.

16. The non-transitory computer readable storage medium of claim 15, wherein the method further comprises parsing the character string and identifying the numeric value as an argument used to execute the corresponding protocol command.

17. The non-transitory computer readable storage medium of claim 16, wherein the argument comprises at least one of a volume level and a temperature level.

* * * * *